Jan. 20, 1959  R. H. COOPER  2,869,194
AUTO-HARDENING PHENOL-FORMALDEHYDE COMPOSITION
AND METHOD OF PREPARING SHELL MOLDS THEREFROM
Filed Sept. 26, 1956
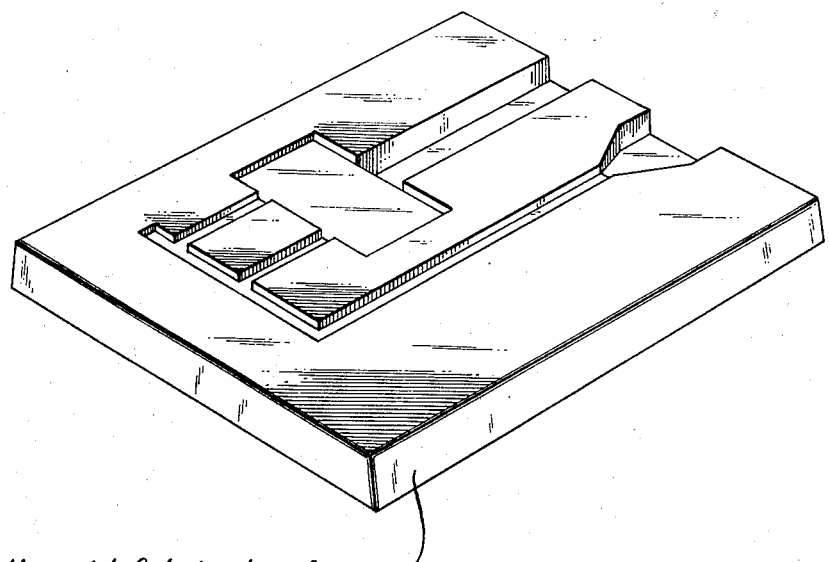
Shell mold fabricated from auto-hardening thermoplastic-thermosetting composition containing inert filler material and catalyzed phenolic liquid resin binder.
INVENTOR.
Ronald H. Cooper
BY
Griswold & Burdick
ATTORNEYS

United States Patent Office 2,869,194
Patented Jan. 20, 1959

2,869,194

AUTO-HARDENING PHENOL-FORMALDEHYDE COMPOSITION AND METHOD OF PREPARING SHELL MOLDS THEREFROM

Ronald H. Cooper, Clare, Mich., assignor to The Dow Chemical Company, Midland, Mich., a corporation of Delaware Application September 26, 1956, Serial No. 612,283

21 Claims. (Cl. 22—193)

This invention has reference to the provision of improved phenolic resin compositions. In particular, it relates to self-hardening compositions of the indicated variety that have thermoplastic and thermosetting characteristics. More particularly, the invention pertains to filled, catalyzed, auto-hardenable compositions and to the thermoplastic and thermosetting masses obtainable from such compositions as well as to a method for their preparation. It is also concerned with the shaped articles and molded structures that are comprised of and may be prepared from the compositions.

It would be an advantage to provide improved phenolic resin compositions containing inert discrete particulate filler ingredients that would be capable of hardening rapidly at room temperatures while retaining effective and useful thermoplastic and thermosetting characteristics over expeditiously broad thermal ranges. It would be particularly beneficial if such compositions had good chemical resistance and were susceptible to being stored for prolonged periods after their initial hardening while being substantially free from deleterious deteriorative consequences upon exposure to moisture or air prior to being permanently thermoset. It would be especially advantageous and extremely desirable if such compositions would have pronounced utility for employment in an adhesive or cementitious capacity and would be peculiarly well suited for utilization in forming composite structures and molded articles, particularly various porous refractory articles and structures including shell molds, hot top devices and the like.

These desiderations and many other advantages and benefits may be achieved with a composition in accordance with the present invention which is comprised of an aqueous phenolic liquid resin in which is incorporated an inert filler material and between about 1 and 35 percent by weight, based on the total weight of the resin in the composition, of a catalyst selected from the group consisting of powdered magnesium oxide, aqueous slurried magnesium oxychloride, aqueous slurried magnesium oxysulfate, and mixtures thereof. In certain instances it may also be advantageous, particularly for purposes of obtaining a faster setting composition, to incorporate in the composition minor proportions of an accelerator curing agent for the phenolic liquid resin such as a polyamine curing agent, including hexamethyl tetramine and the like, or paraformaldehyde, although, in the cases where slower setting times may be preferred, the utilization of an accelerator curing agent may best be avoided. Advantageously, the inert filler that is employed in an acid proof material such as silica sand, graphite and other finely divided aggregates or one of the fibrous filler materials including asbestos shorts and floats. Satisfactory results for a wide variety of applications may be attained when amounts up to and including as much as 40 to 96 or more percent by weight of the composition is comprised of the inert filler material.

The particular properties and characteristics that may be obtained in the compositions of the invention, including their initial self-setting or auto hardening characteristics and their subsequent thermoplastic and thermosetting properties as well as the physical properties of the shaped articles prepared therefrom depend to a great extent upon the particular constitution of the composition that is involved with respect to the specific nature and relative contents of the resin and filler material employed and to the quantity and activity of the catalyst that is utilized in the composition. Generally, the compositions are auto-hardenable within about an hour or so, although when oxychloride or oxysulfate catalysts are employed the resulting compositions may frequently be found to be self-setting at room temperatures within periods of time that are as short as 3 to 7 minutes. In other instances, as when a less active form of the catalyst that is employed is being utilized, particularly when magnesium oxide or magnesium oxide-containing catalysts are involved, or when the quantity of the catalyst that is employed is relatively small, compositions that do not self-harden for periods of time as long as 48 hours may be prepared.

The freshly prepared composition, depending upon its content of inert filler material, may vary from a smooth, trowellable mix having a heavy, cream-like consistency to merely a wet coated filler material such as a coated sand. After their initial auto-hardening has occurred, the compositions are usually thermoplastic and will cohere and agglomerate in the temperature range from about 150 to 250° F. and sometimes higher and may be thermoset, depending upon the particular constitution of the composition that is involved, in the range from about 250 to 600° F. or higher, depending somewhat on the curing time that is employed. Frequently, a curing temperature of 475–500° F. for periods of at least 45 to 60 minutes is satisfactory. When the proportion of resin in the composition is such that it self-hardens to a more or less integral mass, it is ordinarily beneficial to grind or otherwise comminute the self-hardened mass into a discrete particle form for subsequent fabrication into desired shaped articles, unless it is desired to subsequently work or cure the mass in such solidified form as when it has been wet-formed in a desired mold or pattern. However, when enough of the filler material is present in the composition, as when sand is coated with between about 2 to 15 percent by weight, exclusive of the catalyst, of the liquid resin, based on the weight of the composition, the self-hardened composition, especially if it is efficiently mixed during application of the resin, is frequently found to be a dry, free-flowing mass of resin coated particles that oftentimes does not require any further physical reduction for effective subsequent use or which may be rendered free-flowing with a minimum of comminutative effort.

In this connection, as has been indicated, certain of the compositions in accordance with the present invention, particularly coated sand and other refractory compositions, are particularly adapted and exceptionally well suited to be employed for the preparation of shell molds by practicing a manner of fabrication similar to that which is utilized in the so-called Croning process which has been described in F. I. A. T. Final Report (dated May 30, 1947) by the Field Information Agency, Technical, United States Department of Commerce. When appropriately compounded, compositions according to the present invention may readily be converted to thin rigid molds having high gas permeability, good surface smoothness and dimensional stability, and adequate strength for eminently satisfactory employment in shell molding processes. However, in contrast to the conventional resin coated sands and the like preparations employed in the fabrication of shell molds, the compositions of the present invention that are adaptable to such use have the significant advantage and salutary characteristic of being utilizable in a cold production technique which does not require the employment of heat in any form to remove solvents employed in the initial resin coating of the inert filler material. As a result, they are generally relatively safe to use because of their freedom from flammible solvent substances. One of the halves of shell mold fabricated from a composition in accordance with the invention is illustrated in the accompanying drawing. Other formulations of the compositions of the invention can be made readily to particularly adapt them for the fabrication of other porous refractory structures including hot top devices which may advantageously be employed in connection with hot top ingot molding in the manufacture of iron and steel.

When the compositions of the present invention are to be utilized for the preparation of various refractory structures, including shell molds and hot top devices, they may usually be conveniently prepared with any ordinary sand or other refractory material that, advantageously, has a fineness in accordance with the values proposed by the American Foundryman's Society (AFS) that is in the numerical range between about 25 and 180. Such sands, for example, as the types known as Berkeley Float Sand, Juniata Sand, Lake Sand, Vassar Sand, Wedron Sand, Gratiot Bank Sand, Portage 40–60 Sand and the like may be beneficially employed. It is desirable that the sand be clean and substantially free from foreign metal oxides, clay, moisture and organic matter. In many cases it may be more advantageous to employ a refractory material for compositions intended for shell mold fabrication that has an AFS fineness number from about 50 to 125. Very frequently, sands having an AFS fineness number in the neighborhood of 100 may be preferable for shell mold purposes. Relatively coarse sands that have an AFS fineness number between about 25 and 75 are ordinarily more desirable for utilization in compositions intended for fabrication into hot top devices and the like. When compositions that are in accordance with the present invention are intended for shell mold preparation, it is usually desirable for them to have a resin content, exclusive of catalyst and based on the total weight of the composition, that is between about 2 and 15 percent by weight. Frequently, a resin content between about 3 and 10 percent may be even more desirable for such purposes. In the relatively coarse sand-containing compositions according to the invention that are especially well suited for the fabrication of hot top devices and the like, it is generally best to use from about 4 to 10 percent by weight of the resin to provide adequate porosity in the structure and to avoid excessive fire and smoke and possible carbonization of the ingot when the molten metal is burning out the resin in the hot top during the pour.

Advantageously, finely divided magnesium oxide is employed as a catalyst in the compositions of the present invention. It is usually preferable to utilize a magnesium oxide powder that has an average particle size which is not larger than about 40 mesh in the U. S. sieve series. When magnesium oxide is employed as a catalyst, the time that is required for the composition to auto-harden depends to a great extent upon the initial setting characteristics, measured as a function of time, of the magnesium oxide according to A. S. T. M. Specification No. C254–50T. Thus, as is illustrated in the following Table 1, quantitatively uniform and equivalent compositions in accordance with the invention can be prepared that have self-setting times varying from 10 minutes to 24 hours, depending upon the activity of the magnesium oxide catalyst as indicated by its initial A. S. T. M. setting time. Each of the tested compositions in Table 1 contained about 92.5 percent by weight of ordinary AFS 100 sand that had been uniformly coated with a mixture of about 1.5 percent by weight of the catalyst and about 6 percent by weight of a liquid phenol-formaldehyde resin containing about 70 percent by weight of solids in which the mole ratio of formaldehyde to phenol was about 1.45:1. The liquid resin had a pH of about 5 and a viscosity at 77° F. of about 500 centipoises.

Table 1.—Auto-hardening time of various compositions as affected by initial setting time time of magnesium oxide catalyst

| Composition | Initial Setting Time of MgO, hrs. | Auto-Hardening Time of Composition |
| --- | --- | --- |
| A | 0.1 | 10–12 minutes. |
| B | 0.5 | 12–15 minutes. |
| C | 1 | 45 minutes. |
| D | 3 | 6 hours. |
| E | 4 | 10–12 hours. |
| F | 6 | 24 hours. |

It may often be particularly advantageous, especially when compositions for refractory structures including shell molds and hot top devices are involved, to employ a magnesium oxide powder as a catalyst that has a setting time according to the indicated A. S. T. M. specification between about 0.5 and 3 hours.

Magnesium oxychloride or magnesium oxysulfate slurry catalysts can be prepared readily by mixing a suitably active type of magnesium oxide powder with an aqueous solution of magnesium chloride or its equivalent or magnesium sulfate or its equivalent or mixed salt solutions of the indicated variety. In preparing magnesium oxychloride slurry catalysts, the mole ratio of magnesium oxide to magnesium chloride can be varied between about 5 and 17 to 1, respectively, when employing a 25 to 15 degree Baumé solution of the chloride. Greater catalyst activity may be obtained when larger proportions of the oxide are present in the slurry. In a similar manner, magnesium oxysulfate slurry catalysts may be prepared by mixing between about 8 and 25 moles of magnesium oxide with each mole of magnesium sulfate in a 26 to 16 degree Baumé solution thereof. Frequently, as indicated, the oxychloride and oxysulfate slurry catalysts possibilitate the achievement of shorter auto-hardening times in the compositions in comparison with the self-setting periods that may be obtained when magnesium oxide is solely employed as a catalyst. The weight ratio of catalyst to be utilized in the composition is calculated with the total content of the slurry when magnesium oxychloride and magnesium oxysulfate slurries are employed as catalysts.

Regardless of the specific catalyst or combination of catalysts that is employed, it is essential to achieve a uniform and thorough dispersion and mixing of the catalyst in the phenolic liquid resin and to homogeneously blend the resin/catalyst mixture, either independently or in combination with whatever inert filler material is being employed. This is particularly important when sand and other refractory materials are being coated for the preparation of compositions according to the invention that are particularly adapted for the fabrication of various refractory structures, including shell molds and hot top devices.

The initial self-hardening characteristics of the compositions of the invention are also influenced by the relative quantity of catalyst that is present therein. Greater quantities of included catalyst generally shorten the initial self-setting time of the composition. Greater quantities of catalyst also tend to alter the thermoplastic characteristics of the self-hardened compositions by raising their initial softening or melting points. This is illustrated by the data in the following Table 2, wherein the proportions of various magnesium oxide catalysts were varied in several compositions with a phenolic liquid resin (similar to that utilized for deriving the data presented in Table 1) to determine the effect on the auto-hardening time at room temperature of the compositions.

Table 2.—Auto-hardening time of compositions containing varied proportions of magnesium oxide catalyst

| Composition | G | H | J | K |
|---|---|---|---|---|
| Percent by wt. of Liquid Resin in Composition | 94.40 | 88.90 | 77.80 | 64.00 |
| Percent by wt. of MgO Catalyst In Composition | 5.60 | 11.10 | 22.20 | 36.00 |
| Percent by wt. of Catalyst in Composition based on Resin | 5.94 | 12.00 | 28.50 | 56.20 |
| Working or Mixing Time Permissible With Composition Formulated With ½ Hr. MgO Catalyst, minutes | 30 | 20 | 10 | 5 |
| Same With Equivalent Composition Using 6 Hr. MgO Catalyst | 90 | 45 | 30 | 15 |
| Total Auto-Hardening Time Of Composition Formulated With ½ Hr. MgO Catalyst, minutes | 144 | 48 | 18 | 8 |
| Same With Equivalent Composition Using 6 Hr. MgO Catalyst | 160 | 72 | 24 | 12 |
| Melting or Softening Point in °F. of Auto-Hardened Composition | 150 | 230 | 392 | greater than 480 |

As is apparent, shorter self-setting periods result in less permissible working or mixing time for the freshly prepared composition. This may be of particular significance if it is intended ot employ the composition as a mortar or to cause it to substantially or completely assume a desired final fabricated shape before the auto-hardening period has transpired, as may often be the case when forming wet mixtures into hot top devices. For many purposes it is advantageous for the compositions to be formulated with between about 1 and 10 percent by weight of catalyst, based on the weight of the composition. When a refractory inert filler material such as sand is employed and the composition is especially formulated for shell mold fabrication, it is particularly advantageous for the catalyst content to be between about 1 and 2 percent by weight of the composition, especially when an active magnesium oxide powder is utilized as a catalyst.

The aqueous phenolic liquid resin that is employed in the compositions of the present invention may advantageously be a liquid phenol-aldehyde condensation product such as a liquid phenol-formaldehyde resin. Such resins may be prepared conveniently by reacting aqueous mixtures of phenol and formaldehyde, in a known manner, under the influence of basic catalysis. Ordinarily, such liquid resins have a greater than 1:1 mole ratio of formaldehyde to phenol in their constitution. It frequently may be desirable for a phenol-formaldehyde liquid resin to be employed that has a mole ratio of formaldehyde to phenol in the neighborhood of 1.45:1 with a solids content of at least 50 to 70 percent by weight. The viscosity of such an aqueous liquid phenol-formaldehyde resin, which may oftentimes be characterized as being a Stage A resin, may vary from about 100 to 1,000 centipoises when measured at a temperature of about 77° F. The liquid resin may have a pH between 5 and 9. Preferably, the liquid phenol-formaldehyde resin that is utilized has a solids content in the aqueous vehicle of about 60 to 70 percent by weight and a pH between 5 and 8 with a viscosity at 77° F. between about 300 and 500 centipoises.

Compositions in accordance with the invention that are in the nature of coated refractory materials intended for shell mold fabrication may oftentimes be benefitted by the inclusion of minor proportions, say between about 0.1 and 1.0 percent by weight, based on the weight of the resin in the composition, of a curing agent for the phenolic resin. Of the mentioned agents, hexamethylene tetramine may be particularly desirable. Such curing agents may also be incorporated in other compositions according to the invention that are intended for the fabrication of articles other than shell molds, hot top devices and the like refractory structures. Certain wax ingredients may also be incorporated in minor proportions in the compositions of the invention, especially when they are intended for shell molds. By way of illustration, octadecenamide, a light-colored synthetic wax that is available under the trade-designation "Acrawax" from the Glyco Products Company and like substances may often be employed with benefit to eliminate traces of tackiness and improve the free-flowing characteristics of the composition when it is provided as an auto-hardened, free-flowing mass. Paraffin and carnauba waxes and the like may also be utilized in some instances. Ordinarily, a very minor proportion of a wax ingredient, as for example, between about 0.05 and 0.2 percent by weight of the composition may be found satisfactory.

The compositions of the invention may be prepared, as has been indicated, in any desired manner that is capable of achieving a thorough and uniform dispersion and mixture of the liquid resin and the catalyst with the inert filler material and any other ingredients that may be present in the composition. In many cases, particularly when coated sand compositions for shell molds are being prepared, it may be beneficial to first mix the catalyst with the inert filler material, particularly when magnesium oxide is employed as a catalyst, before addition of the phenolic liquid resin is made. The compositions may be prepared in batch or continuous type mixing or mulling equipment and may be utilized as wet mixtures for fabricating purposes as soon as an intimate intermixing has been accomplished. When refractory sands for shell molds and the like are being coated it is beneficial to continue mixing the composition during the auto-hardening period so that a free-flowing composition may be obtained. This may require anywhere from 10 minutes to 2 hours, depending upon the particular equipment that is being utilized and the technique that is employed. In some cases, it may be desirable to permit the freshly wet sand to air dry for a short period (5 to 10 minutes) to permit escape of the water vapor from the composition and to facilitate subsequent granulation of the composition to a free flowing mixture. It is usually beneficial for the self-hardened coated sand composition that are in accordance with the invention and intended for fabrication of shell molds and like structures to be granulated or comminuted to such a degree of particle fineness that the preponderance of the composition, usually at least about 70 percent by weight, has an average particle size that is not larger than about 40 mesh in the U. S. Sieve Series.

The invention is further illustrated in and by the following examples wherein, unless otherwise indicated, all parts and percentages are to be taken by weight.

EXAMPLE I

To about 135 parts of an aqueous liquid phenol-formaldehyde resin (that had about a 70 percent content of solids, a viscosity of about 500 centipoises at 77° F., a pH of about 5 and a mole ratio of formaldehyde to phenol of about 1.45:1) there was gradually added with efficient agitation about 16.2 parts of a magnesium oxide powder that had a setting time of about one hour and an average particle size of about 200 mesh in the U. S. Sieve Series. To this mixture there was gradually incorporated, with efficient mixing, about 148.8 parts of silica that had an average particle size of about 140 mesh in the U. S. Sieve Series. Mixing was continued until a smooth homogeneous paste was obtained which was transferred into mold forms and allowed to self-set, which required about a one hour period. The molded specimens of the auto-hardened composition were thermoplastic in the temperature range from about 150 to 250° F. and could be thermoset at a temperature of about 480° F. for periods of 45 to 60 minutes to provide strong, hard structures. Several of the self-set specimens were ground into powder that was fabricated into various articles in the thermoplastic range of the composition with the articles subsequently being thermoset to strong rigid structures.

EXAMPLE II

The procedure of Example I was repeated with about 141 parts each of the liquid resin and the silica filler excepting to employ about 18 parts of a magnesium oxychloride slurry as the catalyst. The slurry catalyst was prepared by dispersing about 43.2 parts of the same magnesium oxide powder as was employed in the first example with about 60.3 parts of an aqueous 25° Bé. solution of magnesium chloride. The mole ratio of magnesium oxide to magnesium chloride in the slurry catalyst was about 3.5:1, respectively. The results obtained with the composition were equivalent to those realized with the composition of Example I.

Similar results were obtained when an equivalent magnesium oxysulfate slurry catalyst was employed and when slurry catalysts were prepared by mixing magnesium oxide with 35 to 24° Bé. aqueous solutions of calcium chloride in which the mole ratio of magnesium oxide to calcium chloride was varied from between 4 and 13 to 1, respectively.

EXAMPLE III

A coated sand composition that consisted of about 95 percent of clean bank silica sand having an AFS fineness number of about 100; 4.55 percent of a liquid resin containing about 9 parts of an aqueous liquid phenol formaldehyde resin similar to that employed in the preceding examples with an average viscosity of about 500 centipoises at 77° F. and 1 part of hexamethylene tetramine powder mixed intimately in the liquid resin; and 0.45 percent of 40 mesh magnesium oxide powder having a setting time of about one hour was employed to fabricate various shell molds for casting metal. The sand was coated by gradually adding it to a uniform mixture of the liquid resin and magnesium oxide with efficient mixing. The coated sand was auto-hardened to a dry, free-flowing condition within an hour after which they were broken to a fine particle size by passage through a two-roll mill. The finely divided coated sand composition was then formed into the molds by packing it about a desired pattern while it was in a free-flowing condition, heat treating it to form it into the desired shapes while in contact with the pattern at a temperatures in the thermoplastic temperature range from 158 to 248° F. for about 15 seconds; and then thermosetting it at a temperature from 390 to 482° F. After cooling, the shell mold forms were in suitable condition for employment in a shell molding process.

EXAMPLE IV

Several coated sand compositions in accordance with the invention for shell mold fabrication were prepared by premixing the catalyst with the sand in an efficient mulling apparatus and then wet coating the granules with a liquid phenolic resin similar to that employed in the preceding examples. The coated sand was continued to be mixed in each case until the applied resin had autohardened. After a dry, free-flowing resin coated material had been obtained, each of the compositions were shell molded by conventional dump-box practice into various shell molds that were purposely designed along representatively difficult pattern lines containing horizontal flat areas and vertical projections. In the preparation of shell molds from each of the compositions, pattern temperatures between 425 to 500° F. were employed with contact times of the sand composition on the pattern between 12 to 20 seconds. Each of the shell molds were subsequently cured in a gas fired oven at a temperature in the neighborhood of 600° F. for periods of time from 23 to 45 seconds. Little or no dust or odor was generated by the shell molds fabricated from the compositions and they did not delaminate or "peel off" the pattern in an undesirable manner during their fabrication. In the following Table 3 is set forth the formulation of each of the compositions along with data relating to the time cycle necessary to obtain a free-flowing condition in the composition from the initial wet mixing and the proportion of the auto-hardened free-flowing composition that had an average particle size finer than about 40 mesh in the U. S. Sieve Series after the mixing period.

*Table 3.—Coated sand shell mold compositions*

| Composition | Percent Sand | | Percent Liquid Resin(a) | Percent Hexamethylene tetramine in liquid resin | Type and Per Cent Catalyst(b) | Time Cycle Wet Mix to Dry, Free-Flowing Coated Sand, minutes | Percent Coated Sand finer than 40 mesh | Remarks |
|---|---|---|---|---|---|---|---|---|
| | Vassar AFS 100 | Wedron AFS 116 | | | | | | |
| L1 | 97.37 | | 2.00 | 0.14 | MgO/0.49 | 15 | 95 | |
| L2 | | 97.37 | 2.00 | 0.14 | MgO/0.49 | 15 | 95 | |
| M1 | 94.74 | | 4.00 | 0.28 | MgO/0.98 | 20 | 95 | |
| M2 | | 94.74 | 4.00 | 0.28 | MgO/0.98 | 20 | 96 | |
| N1 | 92.08 | | 6.00 | 0.42 | MgO/1.50 | 25 | 95 | |
| N2 | | 92.08 | 6.00 | 0.42 | MgO/1.50 | 25 | 94 | |
| P1 | 89.49 | | 8.00 | 0.56 | MgO/1.95 | 25 | 92 | |
| P2 | | 89.49 | 8.00 | 0.56 | MgO/1.95 | 25 | 91 | |
| Q1 | 86.85 | | 10.00 | 0.70 | MgO/2.45 | 25 | 89 | |
| Q2 | | 86.85 | 10.00 | 0.70 | MgO/2.45 | 25 | 90 | |
| R | 90.80 | | 7.00 | 0.50 | MgO/1.50 | 35 | 87 | |
| S | | 89.49 | 8.00 | 0.57 | MgO/1.94 | 37 | 89 | |
| T | 90.70 | | 7.00 | 0.50 | MgO/1.70 | 40 | 88 | Contains 0.10 Percent "Acrawax." |
| U | | 89.39 | 8.00 | 0.57 | MgO/1.94 | 35 | 90 | Do. |
| V | | 96.24 | 6.00 | 0.63 | MgO/0.63 | 90 | 80 | Do. |
| W | 95.0 | 114 | 4.00 | | {MgO/0.18 MgCl₂/0.25} | 24 hrs. | 90 | Contains 0.10 Percent "Alrosol O"(c) |
| X | 95.0 | 114 | 4.00 | | {MgO/0.18 MgSO₄/0.25} | 14 hrs. | 90 | Do. |

(a) The liquid phenolic resin employed was similar to that in the preceding examples. It contained 70 percent solids in water, had a formaldehyde to phenol mole ratio of 1.45:1, a pH of 5 and viscosity of about 500 centipoises at 77° F.
(b) MgO indicates a 40 mesh magnesium oxide powder with a ½ hour setting time, MgCl₂ indicates a 25° Bé. aqueous solution of magneisum chloride; MgSO₄ indicates a 26° Bé. aqueous solution of magnesium sulfate.
(c) "Alrosol O" is a nonionic surface active fatty alkylol amide condensate that is available from the Geigy Chemical Company.

Excellent molding performance in the preparation of grey iron castings was obtained with the shell molds made from each of the compositions. The castings all had smooth surfaces and clean, sharp edges and indentations.

EXAMPLE V

A plurality of hot type devices were fabricated from compositions prepared in the foregoing manner that consisted of Portage 60–40 AFS 33 core sand containing from 6 to 10 percent of a phenol-formaldehyde liquid resin and about 10 percent on the weight of the resin of a ½ hour, 40 mesh magnesium oxide powder. The liquid resin had 1.45:1 formaldehyde to phenol mole ratio, a solids content between 50 and 60 percent, a pH of 8 and a viscosity of about 300 centipoises at 77° F. The hot tops were fabricated by pressing the wet mixture in a mold form under a ram pressure of about 100 pounds per square inch and permitting it to auto-harden to an integral mass before curing each of the formed hot tops at about 482° F. for an hour. Each of the cured hot tops performed excellently in service during the hot top ingot molding of molten steel at 2900–3000° F. They were able to withstand the ferrostatic pressure of the molten metal and to retain it until solidification after the resin binder had been burned out. They evolved only moderate quantities of fire and smoke during the pour and did not adhere to the solidified ingot. In addition, they disintegrated readily after being burned out to facilitate their being stripped from the ingot.

In addition to shell molds hot top devices and the like, the compositions in accordance with the invention may be utilized advantageously, especially by wet forming techniques, to prepare such objects as bricks, block, tile, porous media and the like.

Certain changes and modifications can be readily entered into in the practice of the present invention without substantially departing from its intended spirit and scope. Therefore, the invention is not intended to be limited or otherwise restricted to or by the preferred deictic embodiments thereof which are included in the foregoing description and specification. Rather, it is to be interpreted and construed in the light of what is set forth in the hereto appended claims.

What is claimed is:

1. Composition which comprises between about 2 and 60 percent by weight, based on the weight of the composition, of an aqueous phenolic liquid resin, said resin being an aqueous phenol-formaldehyde liquid resin that has a greater than 1:1 mole ratio of formaldehyde to phenol, a solids content of at least 50 percent by weight, a pH between 5 and 9 and a viscosity at 77° F. between about 100 and 1,000 centipoises; between about 40 and 98 percent by weight, based on the weight of the composition, of an inert filler material; and between about 1 and 35 percent by weight, based on the total weight of resin in said composition, of a catalyst selected from the group consisting of powdered magnesium oxide having a setting time of less than about 6 hours, aqueous slurried magnesium oxychloride, aqueous slurried magnesium oxysulfate, and mixtures thereof.

2. The composition of claim 1 wherein the catalyst is magnesium oxide powder having a setting time between about 0.10 and 6 hours.

3. The composition of claim 1 wherein the catalyst is magnesium oxide powder having an average particle size not larger than about 40 mesh in the U. S. Sieve Series and a setting time between 0.5 tand 3 hours.

4. The composition of claim 1 wherein the catalyst is a magnesium oxychloride slurry that contains from 5 to 17 moles of magnesium oxide per mole of magnesium chloride in an aqueous solution of the latter having a 25 to 15 degree Baumé concentration.

5. The composition of claim 1 wherein the catalyst is a magnesium oxysulfate slurry that contains from about 8 to 25 moles of magnesium oxide per mole of magnesium sulfate in an aqueous solution of the latter having a 26 to 16 degree Baumé concentration.

6. The composition of claim 1 comprising at least about 40 percent by weight of an acid proof inert filler material.

7. A shaped article fabricated from a composition in accordance with claim 1.

8. Composition that is particularly adapted for the fabrication of refractory structures which comprises between about 2 and 15 percent by weight, based on the weight of the composition, of an aqueous phenolic liquid resin, said resin being an aqueous phenol-formaldehyde liquid resin that has a greater than 1:1 mole ratio of formaldehyde to phenol, a solids content of at least 50 percent by weight, a pH between 5 and 9 and a viscosity at 77° F. between about 100 and 1,000 centipoises; between about 85 and 98 percent by weight, based on the weight of the composition, of a discrete particulate inert refractory filler material; and between about 1 and 2 percent by weight of a catalyst, based on the total weight of resin in said composition, selected from the group consisting of powdered magnesium oxide having a setting time of less than about 6 hours, aqueous slurried magnesium oxychloride, aqueous slurried magnesium oxysulfate, and mixtures thereof.

9. The composition of claim 8 and including between about 0.1 and 1.0 percent by weight, based on the weight of the composition, of a hexamethylene tetramine curing agent for the phenolic liquid resin.

10. The composition of claim 8, wherein the phenolic liquid resin is an aqueous phenol-formaldehyde liquid resin that has a greater than 1:1 mole ratio of formaldehyde to phenol, a solids content of about 60 to 70 percent by weight, a pH between 5 and 8 and a viscosity at 77° F. between about 300 and 500 centipoises.

11. The composition of claim 8 wherein the inert filler material is sand having an AFS fineness number between 25 and 180.

12. The composition of claim 8 wherein the aqueous phenolic liquid resin comprises between about 3 and 10 percent by weight of the composition; the inert filler material is sand having an AFS fineness number from 50 to 125 and the catalyst is magnesium oxide having an average particle size not larger than about 40 mesh in the U. S. Sieve Series and a setting time between about 0.5 and 3 hours.

13. A shell mold that has been fabricated from a composition in accordance with that set forth in claim 12.

14. A hot top device that has been fabricated from a composition in accordance with that set forth in claim 8, wherein the aqueous phenolic liquid resin comprises between about 4 and 10 percent by weight of the composition; the inert filler material is sand having an AFS fineness number from 25 to 75 and the catalyst is magnesium oxide having an average particle size not larger than about 40 mesh in the U. S. Sieve Series and a setting time between about 0.5 and 3 hours.

15. Method for the preparation of a composition which comprises thoroughly mixing between about 40 and 98 percent by weight, based on the weight of the composition, of an inert filler material with between about 2 and 60 percent by weight, based on the weight of the composition, of an aqueous liquid phenolic resin, said resin being an aqueous phenol-formaldehyde liquid resin that has a greater than 1:1 mole ratio of formaldehyde to phenol, a solids content of at least 50 percent by weight, a pH between 5 and 9 and a viscosity at 77° F. between about 100 and 1,000 centipoises, and between about 1 and 35 percent by weight, based on the weight of resin in the composition, of a catalyst selected from the group consisting of powdered magnesium oxide having a setting time of less than about 6 hours, aqueous slurried magnesium oxychloride, aqueous slurried magnesium oxysulfate, and mixtures thereof and subsequently permitting the resulting mixture to auto-harden to a composite mass.

16. The method of claim 15 and including the additional final step of comminuting the auto-hardened mass to a free-flowing condition.

17. Method for the preparation of a composition that is particularly adapted for the fabrication of refractory structures which comprises thoroughly mixing between about 85 and 98 weight percent, based on the weight of the composition, of sand having an AFS fineness number between about 25 and 180 with between about 2 and 15 percent by weight of an aqueous liquid phenolic resin, based on the weight of the composition, said resin being an aqueous phenol-formaldehyde liquid resin that has a greater than 1:1 mole ratio of formaldehyde to phenol, a solids content of at least 50 percent by weight, a pH between 5 and 9 and a viscosity at 77° F. between about 100 and 1,000 centipoises, and between about 1 and 2 percent by weight of a catalyst selected from the group consisting of powdered magnesium oxide having a setting time of less than about 6 hours, aqueous slurried magnesium oxychloride, aqueous slurried magnesium oxysulfate, and mixtures thereof and subsequently permitting the resulting mixture to auto-harden while continuously mixing said mixture during said auto-hardening to cause a preponderant proportion of said composition to have an average particle size not larger than about 40 mesh in the U. S. Sieve Series.

18. The method of claim 17 wherein the catalyst is magnesium oxide powder that is intimately dispersed throughout the sand before the phenolic liquid resin is incorporated in the composition.

19. Method for the preparation of shaped articles which comprises thoroughly mixing between about 40 and 98 percent by weight, based on the weight of the composition, of an inert filler material with between about 2 and 60 percent by weight, based on the weight of the composition, of an aqueous liquid phenolic resin, said resin being an aqueous phenol-formaldehyde liquid resin that has a greater than 1:1 mole ratio of formaldehyde to phenol, a solids content of at least 50 percent by weight, a pH between 5 and 9 and a viscosity at 77° F. between about 100 and 1,000 centipoises, and between about 1 and 35 percent by weight, based on the weight of resin in the composition, of a catalyst selected from the group consisting of powdered magnesium oxide having a setting time of less than about 6 hours, aqueous slurried magnesium oxychloride, aqueous slurried magnesium oxysulfate, and mixtures thereof; forming the resulting composition to a desired shaped article; and subsequently thermosetting said formed auto-hardened composition at a curing temperature in its thermosetting temperature range.

20. Method for the fabrication of shell molds which comprises thoroughly mixing from 85 to 98 parts by weight of sand having an AFS fineness number between about 25 and 180 with between about 2 and 15 parts by weight of an aqueous liquid phenolic resin, said resin being an aqueous phenol-formaldehyde liquid resin that has a greater than 1:1 mole ratio of formaldehyde to phenol, a solids content of at least 50 percent by weight, a pH between 5 and 9 and a viscosity at 77° F. between about 100 and 1,000 centipoises, and between 1 and 2 parts by weight of a catalyst selected from the group consisting of powdered magnesium oxide having a setting time of less than about 6 hours, aqueous slurried magnesium oxychloride, aqueous slurried magnesium oxysulfate, and mixtures thereof; permitting the resulting mixture to auto-harden to a thermoplastic, thermosetting mass while continuously mixing said mixture during said auto-hardening to cause a preponderant proportion of the mixture to have an average particle size not larger than about 40 mesh in the U. S. Sieve Series; placing said mixture in contact with a shell mold pattern at a temperature that is adapted to thermoplastify said composition for a period of time sufficient to permit a layer of the mixture to become thermoplastic and assume the form of said pattern; removing excess mixture from the thermoplastically cohering and agglomerated formed mixture; and subsequently curing the formed mixture at a thermosetting temperature for the composition.

21. A composition in accordance with the composition set forth in claim 10, wherein said phenolic liquid resin has a ratio of formaldehyde to phenol in its composition of about 1.45:1, respectively.

References Cited in the file of this patent

UNITED STATES PATENTS 2,662,067    Less et al. _____ Dec. 8, 1953

FOREIGN PATENTS 305,237    Great Britain _____ May 2, 1930